United States Patent
Carlson

[15] 3,678,619
[45] July 25, 1972

[54] PLANT COVER

[72] Inventor: William C. Carlson, Box 7, R.R. 1, Burnum, Minn. 55707

[22] Filed: Aug. 31, 1970

[21] Appl. No.: 68,402

[52] U.S. Cl. ................................47/29, 160/130, 248/439
[51] Int. Cl. ..........................................................A01g 13/04
[58] Field of Search ............................60/130, 135; 135/4.5; 47/19–22, 26–32; 248/439; 108/129, 131–132

[56] References Cited

UNITED STATES PATENTS

| | | | |
|---|---|---|---|
| 3,538,976 | 11/1970 | Gilbert et al. | 160/130 |
| 279,778 | 6/1883 | Long | 248/439 |
| 326,872 | 9/1885 | Johnston | 47/31 |
| 2,051,643 | 8/1936 | Morrison | 47/28 |
| 1,638,863 | 8/1927 | Mabe | 47/29 X |

FOREIGN PATENTS OR APPLICATIONS

| | | | |
|---|---|---|---|
| 835,697 | 5/1960 | Great Britain | 47/29 |
| 68,310 | 4/1958 | France | 47/21 |

*Primary Examiner*—Robert E. Bagwill
*Attorney*—Allen A. Dicke, Jr.

[57] ABSTRACT

The plant cover has a rectangular top frame and first and second rectangular side frames pivotally interconnected so that they can be substantially orthogonally positioned. In such position, the side frames act as sides and legs which hold the top frame above the ground. When not in use, the side frames fold into the top frame. The top frame and side frames are covered with a material substantially transparent to actinic rays, so that the structure can be erected and placed over a plant to protect the plant from frost or otherwise enclose the region around the plant.

4 Claims, 4 Drawing Figures

Patented July 25, 1972  3,678,619

INVENTOR;
WILLIAM C. CARLSON
BY;
ALLEN A. DICKE, JR.,
AGENT 3,678,619

PLANT COVER

BACKGROUND

This invention is directed to a plant cover which can be unfolded and placed over a plant to enclose the region around a plant.

In view of the fact that the northern climates of the United States have a shortened growing period due to late spring frost and early fall frost, a considerable amount of attention has been given to the protection of annual plantings so that they can be planted early, without fear of late frost, and so they are not frost-killed in the fall before their fruit is ripe. U.S. Pat. Nos. such as 71,812; 364,253; 1,392,178; and 2,691,848 illustrate plant covers which have restricted area in the top thereof. These are not useful for plants which have full heads or tops. Other previously-known structures, such as illustrated in U.S. Pat. No. 754,322 are difficult to erect. Others, such as in U.S. Pat. No. 1,043,594 have so many sides that they are difficult to fold down into a minimum size.

The need for protection of plants is well-known, but even modern attention to the question has not produced a structure which is easily erected from a compact position, which provides adequate plant protection even for plants which have full tops.

SUMMARY

In order to aid in the understanding of this invention, it can be stated in essentially summary form that it is directed to a plant protector which has a rectangular top frame and first and second rectangular side frames. The side frames are smaller than the top frame and are pivoted to the top frame so that they can fold inside of the top frame in the folded storage condition, and can be swung out to substantially right angles to the top frame to form legs for the support of the top frame and sides for the plant protector. The top and side frames are covered with a material which is fairly transparent to actinic radiation. The covering on the top frame is extendable down the sides to provide a rectangular enclosure.

Accordingly, it is an object of this invention to provide a plant protector which is economic of manufacture and is easy to use so that it is widely available to those persons who require enclosure of annual plants. It is a further object to provide a plant protector wherein a protector folds into a small configuration for ease of storage. It is a further object to provide a plant protector where the several parts are pivoted together so that they may be easily erected into position for use. It is still another object to provide a plant protector which comprises a rectangular top frame, and first and second rectangular side frames which are smaller than the top frame and which are pivotable from a position where they are enclosed by the top frame to a position where they are dependent therefrom to act as top frame supports. Other objects and advantages of this invention will become apparent from a study of the following portion of the specification, the claims and the attached drawings.

DESCRIPTION

Figure 1:
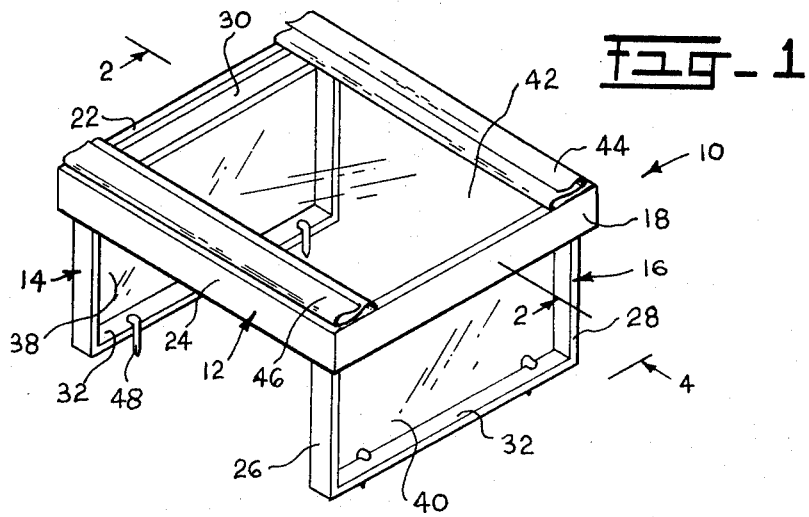
FIG. 1 is an isometric view of the plant protector of this invention shown in the erected position.

The plant cover is generally indicated at 10 in the drawings. Plant cover 10 comprises top frame 12 and side frames 14 and 16. Top frame 12 is an open-work frame comprised of frame members 18, 20, 22, and 14. These four frame members are attached together in open-centered rectangular configuration, as is best illustrated in FIG. 1.

Side frames 14 and 16 are each also of open-centered rectangular configuration. Side frame members 26 and 28 of side frames 16 are easily seen in FIG. 1. In addition to the side frame members, each of the side frames has a top crossbar frame member 30 and a bottom crossbar frame member 32. Only one top crossbar frame member 30 is illustrated, it being seen on side frame 14 in FIG. 1. However, each of the side frames has such a frame member. Each of the side frame members is equipped with a pivot pin, such as illustrated at 34 and 36 in FIGS. 2 and 3. The pivot pins extend through the side frame members of the side frames and at least into frame members 20 and 24. These pivot pins permit the side frames to have pivotal motion with respect to the top frame.

Figure 2:
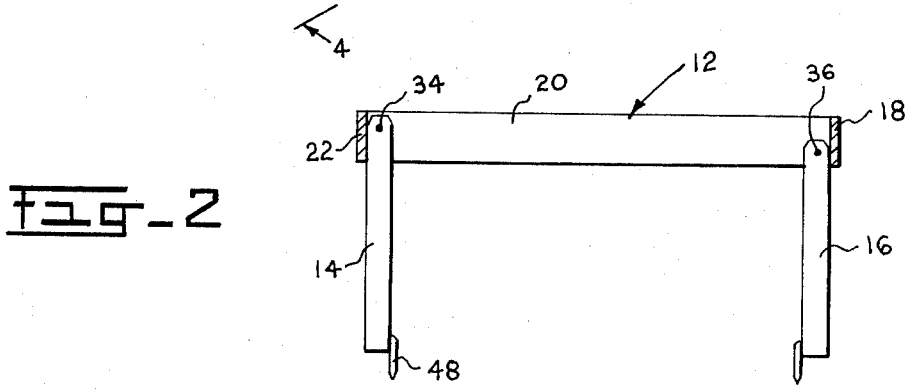
FIG. 2 is a section taken generally along the line 2—2 of FIG. 1.
Figure 3:
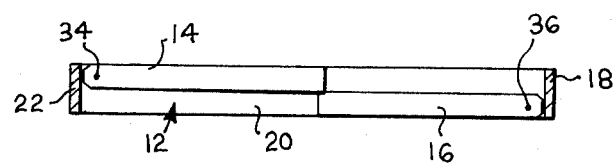
FIG. 3 is a section similar to FIG. 2, but showing the plant protector in the folded position.

As illustrated in FIG. 2, when the side frames 14 and 16 are swung to the right angular, dependent position in which the side frames act as legs, they lie against frame members 18 and 22 to act as an outward pivotal stop. Furthermore, as illustrated in FIGS. 2 and 3, the thickness of the side frames is half or less the thickness of the top frame so that the side frames can be swung into overlapping, recessed position within the top frame, as illustrated in FIG. 3. The location of the pivot pins 34 and 36 in frame members 20 and 24 is staggered for this purpose. The plant cover 10 is usually not intended to be twice as long as it is high, when in the erected condition and, thus, the overlap of the side frames, when they are folded into the recessed position, is necessary. On the other hand, in certain special conditions for the protection of low plants, it may be desirable to provide a plant cover 10 which is more than twice as long as it is high. In that condition, overlap is not necessary and pivotal offset of the side frame pivots in the top frame is not necessary. However, the configuration illustrated is the preferred embodiment.

Flexible protective material which is substantially transparent to the actinic radiation which stimulates proper growth of plants is employed to cover the frame. Suitable material is selected from the class of synthetic polymer composition material films, on a basis of their transmissibility. A particular suitable material is polyethylene sheet, which is commonly commercially available. Transparent or translucent sheeting is useful, depending upon the desired characteristics of radiation transmissibility. The preferred material of the top frame and side frames is wood, which is easily handled and be conveniently attached by conventional techniques. When wood is employed as frame members, the protective sheeting can be secured thereto by stapling. Protective sheeting is illustrated on side frames 14 and 16 and is indicated by numerals 38 and 40. The protective sheets 38 and 40 are preferably co-extensive with the outer edges of the side frames, for convenience in securement.

Figure 4:
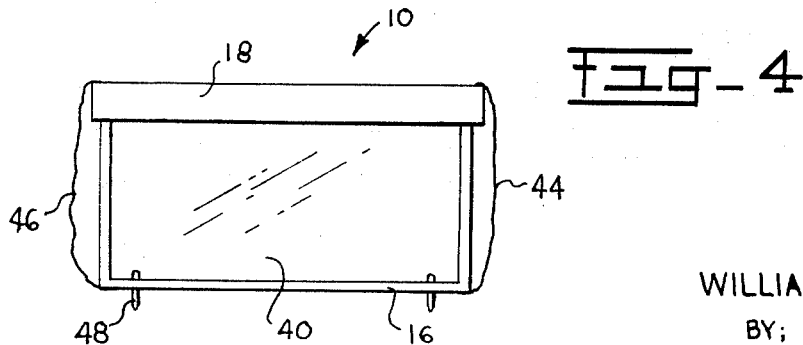
FIG. 4 is a side-elevational view seen generally along the line 4—4 of FIG. 1.

Similarly, top frame 12 carries protective sheet 42. Protective sheet 42 is co-extensive in the direction toward frame members 18 and 22 with the top frame. However, in the lateral direction over frame members 20 and 24, it respectively has flaps 44 and 46 which extend beyond the frame members to a greater length than the height of side frames 14 and 16 when they are in the extended position illustrated in FIGS. 2 and 4. These flaps can be brought downward and tucked under the side frames, as illustrated in FIG. 4, in order to close the otherwise open ends of the plant cover. These flaps can be regulated in accordance with ventilation requirements for the plant.

In use, the plant cover 10 is erected, as shown in FIGS. 1, 2, and 4, and is placed over the plant to be protected. Where sufficient wind to upset the plant cover may occur, the plant cover can be secured in place by means of stakes 48. These stakes are engaged over the bottom crossbar frame members 32, and may be either L-shaped for simple engagement over the bottom crossbar frame members 32 and into the ground, or may have short hooks to engage into the frame members 32 in a downward direction. A sufficient number of stakes 48 are used to adequately secure the plant cover 10 in place. When secured in place in the erected condition, the plant cover already has protective sheeting on the top and two sides of the plant. The gardener regulates the amount of enclosure by management of the flaps 44 and 46. In most severe frost conditions, both flaps are brought down and tucked under the bottom crossbar frame members 32, as illustrated FIG. 4. Where that degree of protection does not appear to be required, one or the other of the flaps can be positioned in a raised configuration.

When stored, the stakes 48 are removed and separately stored; flaps 44 and 46 are folded back across the top frame, while the side frames 14 and 16 are folded up into the interior of the top frame, as shown in FIG. 3. In this condition, compact storage is accomplished.

This invention having been described in its preferred embodiment, it is clear that it is susceptible to numerous modifications and embodiments within the ability of those skilled in the art and without the exercise of the inventive faculty.

What is claimed is:

1. A plant cover, said plant cover comprising:

an open-centered rectangular top frame;

first and second open-centered rectangular side frames pivotally mounted with respect to said top frame, said side frames being of smaller dimension than said top frame and being positioned at least partly within said top frame and movable from a storage position wherein they are positioned completely within said top frame to a supporting position wherein said side frames extend from said top frame to support said top frame away from the ground, said side frames being substantially half as thick as said top frame, said pivotal mounting of said side frames being pivot pins pivotally attaching said side frames to said top frame, said pivot pins being offset so that both said side frames are pivotally positionable within the confines of said top frame;

protective sheet material secured to said top frame and extending completely across the open center thereof so that it is substantially coextensive with the edges of said top frame in a direction toward said side frame pivots, said protective sheet material extending over the other edges of said top frame substantially as far as the height of said side frames when they are in the supporting position so that said protective sheet material secured to said top frame is positioned over the top of said frame cover and down the two sides thereof away from said side frames, and protective sheet material extending completely across the open center of each of said side frames so that said plant cover can be placed over a plant when said side frames are in supporting position to protect the plant.

2. The plant cover of claim 1 herein said protective sheet material is substantially transparent to actinic radiation favorable to plant growth.

3. The plant cover of claim 1 wherein said protective sheet material is flexible synthetic polymer composition material which permits transmission of at least some of the actinic radiation favorable to plant growth.

4. The plant cover of claim 1 further including stakes, said stakes being engageable over part of said side frames and into the ground to secure said plant cover with respect to the ground.

* * * * *